UNITED STATES PATENT OFFICE.

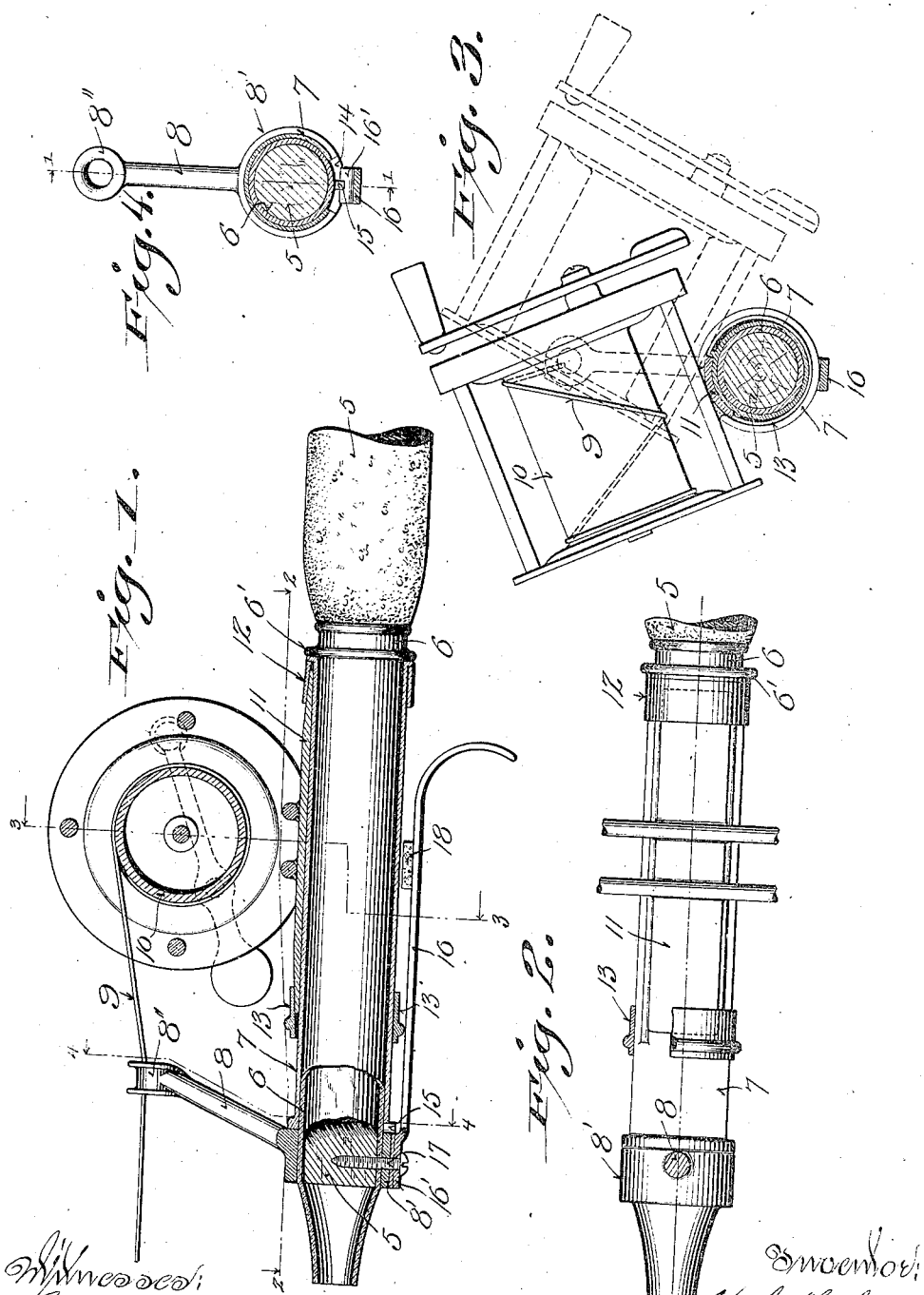

CHARLES TOEPFER, OF MILWAUKEE, WISCONSIN.

FISHING-TACKLE.

1,041,376.  Specification of Letters Patent.  Patented Oct. 15, 1912.

Application filed December 16, 1911. Serial No. 666,241.

*To all whom it may concern:*

Be it known that I, CHARLES TOEPFER, a citizen of the United States, and resident of Milwaukee, in the county of Milwaukee and State of Wisconsin, have invented certain new and useful Improvements in Fishing-Tackle; and I do hereby declare that the following is a full, clear, and exact description thereof.

My invention consists in what is herein particularly set forth with reference to the accompanying drawings and pointed out in the claims of this specification, its main object being to provide for automatic oscillation of a line reel on a fishing-rod when spooling the line through an adjacent fixed line-guide, the oscillatory movement of the reel serving to insure the even winding of said line from head to head of the reel-spool without thumbing on the part of the operator.

Figure 1 of the drawings represents a side elevation of a fragment of the stock of a fishing-rod equipped with an oscillative line-reel seat and a fixed line-guide in accordance with my invention, parts of the equipment and a friction-brake therewith being in section on line 1—1 in Fig. 4; Fig. 2, a plan view of said equipment partly in horizontal section on line 2—2 in Fig. 1; Fig. 3, a view partly in section on line 3—3 of Fig. 1, and illustrating the reel by full and dotted lines in the extremes of its oscillation, and Fig. 4, a view partly in section on line 4—4 in Fig. 1.

Referring by numerals to the drawings 5 indicates the stock of a fishing-rod having a ferrule 6 fast thereon, and loose on the ferrule, in opposition to an outer head 6' of the same, is a reel-seat sleeve 7 shown as preferably outwardly flanged at both ends. Fastened on the ferrule, in opposition to the outer end of the sleeve 7, is the lower collar-end 8' of an arm 8 having an upper eye-end 8'' through which a fishing-line 9 is guided to the spool 10 of a reel having the base 11 thereof clamped upon said sleeve by a fixed band 12 and a sliding band 13. The outer end of the sleeve 7 is provided with a play recess 14 engaged by a stop-lug 15 of the collar end 8' of the arm 8, and thus said sleeve is free to oscillate upon the ferrule 6 within predetermined limits. The oscillatory movement of the sleeve 7 and the reel fast thereon is a result of an operation of the reel-spool 10, and incidental thereto, the line 9 passing through the guide 8'' is laid evenly from head to head of said spool, whereby thumbing of said line to accomplish the same purpose is rendered unnecessary.

With an automatically oscillative reel in proximity to a fixed line guide, as herein specified an inexperienced person may properly spool the line, and expert anglers employing said reel as aforesaid will avoid thumb-soreness that results from thumbing the line when spooling the same.

The usual under finger-grip member 16 of the fishing-rod is herein shown as for the most part in the form of a leaf-spring having a thickened forward extremity 16' seated in a notch of the collar-end of the arm 8 and fastened therewith to the ferrule 6 and the rod-stock 5 by a screw 17. The finger-grip member may be made to serve as a friction-brake against the sleeve 7 when it is desirable to prevent oscillation of the reel, and it is preferred to provide a friction-block 18 on said finger-grip member in opposition to said sleeve.

I claim:

1. A fishing-rod, a ferrule fast on the rod, a reel-seat sleeve permanently loose on the ferrule, means limiting oscillation of the sleeve, a fixed line-guide in proximity to said sleeve forward of the same, a reel in rigid connection with the aforesaid sleeve, and a line extending from the reel through the guide.

2. A fishing-rod, a ferrule fast on the rod, a reel-seat sleeve permanently loose on the ferrule, a fixed line-guide in proximity to said sleeve forward of the same, a reel in rigid connection with said sleeve, a line extending from the reel through the guide, and a friction brake for the aforesaid sleeve constituting an under finger-grip in connection with the rod.

In testimony that I claim the foregoing I have hereunto set my hand at Milwaukee in the county of Milwaukee and State of Wisconsin in the presence of two witnesses.

CHARLES TOEPFER.

Witnesses:
 N. E. OLIPHANT,
 MAY DOWNEY.